United States Patent [19]

Matsuzaki

[11] Patent Number: 4,725,862

[45] Date of Patent: Feb. 16, 1988

[54] INK JET WETTING-TREATED RECORDING HEAD AND PROCESS

[75] Inventor: Makoto Matsuzaki, Shiojiri, Japan

[73] Assignee: Seiko Epson Kabushiki Kaisha, Tokyo, Japan

[21] Appl. No.: 873,845

[22] Filed: Jun. 10, 1986

Related U.S. Application Data

[63] Continuation of Ser. No. 632,171, Jul. 19, 1984, abandoned.

[30] Foreign Application Priority Data

Jul. 20, 1983 [JP]  Japan .................................. 58-132161

[51] Int. Cl.⁴ ........................ G01D 15/18; B65B 1/04
[52] U.S. Cl. .................................. 346/140 R; 346/75;
346/140 A; 141/1; 141/20.5
[58] Field of Search ................ 346/140 R, 75, 140 A;
525/419; 141/1, 20.5

[56] References Cited

U.S. PATENT DOCUMENTS

| | | | |
|---|---|---|---|
| 4,005,440 | 1/1977 | Amberntsson et al. | 346/140 R |
| 4,181,689 | 1/1980 | Nagatoshi et al. | 525/419 |
| 4,364,066 | 12/1982 | Koto | 346/140 R |
| 4,368,476 | 1/1983 | Uehara et al. | 346/140 R |
| 4,368,478 | 1/1983 | Koto | 346/140 R |
| 4,437,100 | 3/1984 | Sugitani et al. | 346/1.1 |

Primary Examiner—E. A. Goldberg
Assistant Examiner—Gerald E. Preston
Attorney, Agent, or Firm—Blum Kaplan

[57] ABSTRACT

An ink-jet recording head formed from a base and a vibrating plate attached to the base with the surfaces therebetween defining a plurality of ink passageways terminating in a nozzle at one end of the head is provided. The base and the plate are both formed from a synthetic resin with the surfaces activated by a surface treatment to increase the polar groups and unsaturated bonds to increase the wetting property. Surface treatment includes treating with a $K_2Cr_2O_7$—$H_2SO_4$ or $H_2SO_4$—$SO_3$ solution, $SO_3$ gas, ultraviolet rays, plasma, corona discharge, electron beam, or flame. A process for making the head is also disclosed.

18 Claims, 4 Drawing Figures

INK JET WETTING-TREATED RECORDING HEAD AND PROCESS

This is a continuation of application Ser. No. 06/632,171, filed July 19, 1984.

BACKGROUND OF THE INVENTION

This invention relates to an ink-jet recording head which provides flying drops of ink to form an image on a recording medium, and more particularly to an improved recording head formed from a synthetic resin for an ink-on-demand type ink jet printer.

An ink-jet recording head is by far easier to form from a high molecular weight resin, particularly an amorphous thermoplastic resin than from glass or metal. However, a head formed from such a resin has a serious disadvantage due to the physical properties of the resin. There is a greater angle of contact between the ink and the surface of the head formed of the resin than when the surface of the head is formed from glass or metal. When the recording head formed of resin is fed with ink, bubble are likely to form in the pressure chamber and are difficult to remove therefrom. These bubbles are likely to result in the failure of the head to provide proper recording function.

Accordingly, it is desirable to provide an ink-jet recording head formed from a synthetic resin having properties comporable to that of a recording head formed of glass.

SUMMARY OF THE INVENTION

Generally speaking, in accordance with the invention, an improved ink-jet recording head formed from a high-molecular weight synthetic resin is provided. The preferred resin is a thermoplastic resin, such as a polysulfone, polyether sulfone, AS, ABS, polybutylene terephthalate (PBT), polyarylate (PAR), polyether ether ketone (PEEK), polymethyl methacrylate (PMMA), polycarbonate, polyester, polyamide, polyimide, polyphenylene oxide (PPO), polyphenyl ether (PPE) or polyphenylene sulfide resin having improved resistance to bubble formation. The surfaces of the head are treated with a surface treatment to increase the wetting property to improve the angle of contact between the ink and the resin surface.

The surface is improved by a surface treatment which causes formation of polar groups or new unsaturated bonds on the resin surface. The surface treatment includes treating the head surfaces with a $K_2Cr_2O_7$—$H_2SO_4$ or $H_2SO_4$—$SO_3$ solution, $SO_3$ gas, ultraviolet rays, plasma, corona discharge, electron beam or flame.

Accordingly, it is an object of the invention to provide an improved ink-jet recording head.

It is another object of the invention to provide an improved method of manufacturing an ink-jet recording head.

It is a further object of the invention to provide an improved an ink-jet recording head formed from a synthetic resin.

Yet another object of the invention is to provide an improved ink-jet recording head formed from a high-molecular weight synthetic resin wherein the passageways are treated to resist formation of bubbles and facilitate removal of bubbles which form therein.

Yet a further object of the invention is to provide an improved synthetic resin ink-jet recording head wherein the passageways have been subjected to a surface treatment to form polar groups and new unsaturated bonds thereon.

Still another object of the invention is to provide a method of treating the surfaces of a synthetic resin ink-jet recording head to form polar groups and new unsaturated bonds on the surface to improve the wetting properties thereof.

Still a further object of the invention to provide an improved method of treating the surfaces of a synthetic resin ink-jet recording head with a $K_2Cr_2O_7$—$H_2SO_4$ or $H_2SO_4$—$SO_3$ solution, $SO_3$ gas, ultraviolet rays, plasma, corona discharge, electron beam or flame to increase the wetting properties thereof.

Still other objects and advantages of the invention will in part be obvious and will in part be apparent from the specifications.

The invention accordingly comprises the several steps and the relation of one or more of such steps with respect to each of the others, and the product possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to be following description taken in connection with the accompanying drawings, in which.

DESCRIPTION OF THE PREFERRED EMBODIMENTS

Figure 1:
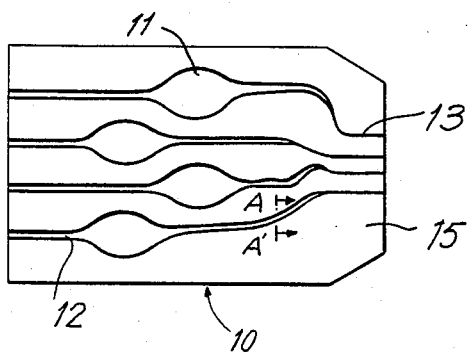
FIG. 1 is a schematic view of a recording head constructed in accordance with the invention.
Figure 2:
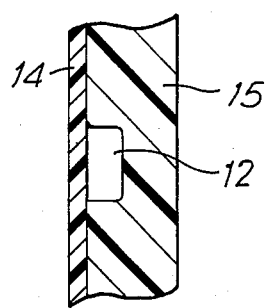
FIG. 2 is an enlarged sectional view taken along the line A-A' of FIG. 1.

A recording head 10 constructed in accordance with the invention is schematically shown in FIGS. 1 and 2. Recording head 10 includes a base 15 and a vibrating plate 14 attached to base 15. Base 15 is formed with a plurality of ink passageway 12, each having an enlarged portion which defines a pressure chamber 11. Each ink passageway 12 also defines a nozzle 13 at one end thereof. Vibrating plate 14 and base 15 are formed from a thermoplastic resin, such as a polysulfone, polyether sulfone, AS, ABS, PBT, PAR, PEEK, PMMA, polycarbonate, polyester, polyamide, polyimide, PPO, PPE or polyphenylene sulfide resin.

Each of vibrating plate 14 and base 15 has a surface which has been activated by treatment with a $K_2Cr_2O_7$—$H_2SO_4$ or $H_2SO_4SO_3$ solution, $SO_3$ gas, ultraviolet rays, plasma, corona discharge, electron beam or flame. This surface treatment causes formation of polar groups or new unsaturated bonds on the resin surface and thereby substantially improves its wetting property. Improved wetting improves the angle of contact between ink and resin surface, to the extent that no bubble forms in any pressure chamber 11 when head 10 is fed with ink, and that, should any bubbles form in any pressure chamber 11, they can easily be removed therefrom.

Vibrating plate 14 and base 15 are treated as hereinabove described and are assembled. Then, the assembly is cut at one end to form nozzle 13. The surfaces of nozzle 13 are, therefore, low in wetting property, while the surfaces in passageway 12 are high in wetting property. This improves the response to head 10 to the printing operation, restricts entry of any bubbles into nozzle 13 and enables the flying of ink drops in a straight path.

The invention will now be described more specifically with reference to several examples. These examples are set forth for proposed of illustration and not intended to be limiting.

EXAMPLE 1

Figure 3:
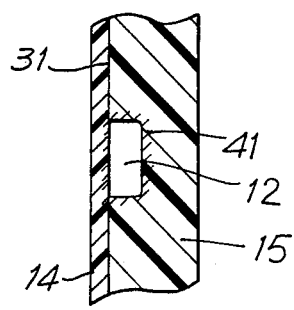
FIG. 3 is a view similar to FIG. 2 showing a recording head constructed in accordance with the embodiment of Example 1.

In this example a $K_2Cr_2O_7$—$H_2SO_4$ solution was used for the the surface treatment. A base 15 and a vibrating plate 14 were formed from a transparent polysulfone resin, washed and dried. They were joined together along a seam 31 at a temperature of 80° C. utilizing a dope cement prepared by dissolving the same polysulfone resin in a solvent, as shown in FIG. 3.

A solution containing 50% by weight of $H_2SO_4$, 8% by weight of $K_2C_2O_7$ and 42% by weight of $H_2O$ and heated to a temperature of 30° C. to 100° C. was injected by a pump into ink passageway 12 between vibrating plate 14 and base 15. After a period of one to 60 minutes had passed, the assembly was washed, dried and cut at one end thereof to open nozzle 13 to provide a recording head 10 in which all of the surfaces defining ink passageway 12 had been treated with the solution in the region shown by short slanting lines at 41 in FIG. 3.

Polar groups were formed on resin surfaces 41 activated by the solution, greatly improving their wetting property. A slight reduction in the transparency of treated surface 41 as compared with the untreated portions provided a criterion for judgment as to the propriety of not only the treatment, but also the adhesion between vibrating plate 14 and base 15.

Similar results were obtained on the recording heads of which the vibrating plates and the bases had been formed from the other resins as hereinbefore listed.

The $K_2Cr_2O_7$—$H_2SO_4$ solution suitable for use for the treatment of the surfaces defining the ink passageways contains about 35 to 65% by weight of $H_2SO_4$, 5 to 35% by weight of $K_2Cr_2O_7$ and 0 to 60% by weight of $H_2O$.

EXAMPLE 2

In this example ultraviolet rays were used for the surface treatment. A base 15 and a vibrating plate 14, which had both been formed from a polysulfone resin, were washed and dried, and ultraviolet rays were radiated on base 15 and vibrating plate 14 by a lowpressure mercury lamp for five minutes in the air. They were, then, joined together along seam 31 at a temperature of 80° C. by a dope cement prepared by dissolving the same polysulfone resin in a solvent, as shown in FIG. 4.

Figure 4:
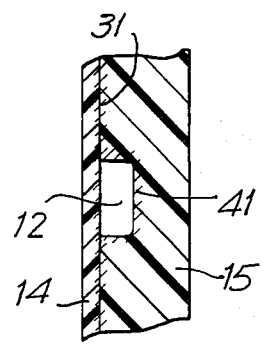
FIG. 4 is a view similar to FIG. 3 constructed in accordance with the embodiment described in Examples 2 to 7.

The assembly was cut at one end to open nozzles 13 and provided a recording head in which all of the surfaces defining ink passageway 12 had been treated by ultraviolet rays, as shown by short slanting lines at 41 in FIG. 4. Polar groups were formed on resin surface 41 by the radiation of ultraviolet rays which greatly improved their wetting property. The ultraviolet radiation treatment has the advantage of being carried out easily and quickly. Similar results were obtained on recording heads wherein the vibrating plate and the base had been formed from other resins of the type listed above.

EXAMPLE 3

In this example a plasma jet was used for the surface treatment. A base and a vibrating plate, both formed from a polysulfone resin, were washed and dried, and a jet of argon gas plasma was radiated onto the base and the vibrating plate for five minutes in air. They were joined together using a dope cement prepared by dissolving the same polysulfone resin in a solvent at a temperature of 80° C. The assembled parts were cut at one end to open the nozzles and provide a recording head in which all of the surfaces defining the ink passageways had been treated by the plasma. Polar groups and unsaturated bonds were formed on the resin surfaces by the plasma, and greatly improved their wetting property.

EXAMPLE 4

A base and a vibrating plate, both formed from a polysulfone resin, were washed and dried and placed in an argon gas atmosphere having a low pressure of $10^{-3}$ to 0.1 mmHg.

An accelerated voltage of 0.5 to 3 kV was applied to the atmosphere to produce an argon plasma, and the base and the vibrating plate were exposed to the plasma for a period of one to 10 minutes. A recording head made by using the treated base and plate showed a greatly improved wetting property in the surfaces defining the ink passageways. Similar results were obtained with additional recording heads treated by introducing oxygen gas having a pressure up to $10^{-2}$ mmHg into the argon gas atmosphere.

The surfaces activated by the plasma did not show any reduction in wetting property despite wahsing, heating at a temperature lower than a point which might cause their thermal deformation, or for long periods of immersion in ink. The use of the plasma was found to provide surface treatment with a higher degree of stability reliability than the solution of Example 1 and the ultraviolet rays of Example 2.

Similar results were obtained on recording heads wherein the vibrating plates and the bases were formed from the other resins of the type listed above.

EXAMPLE 5

In this example the surfaces defining the ink passageways of a recording head were treated by corona discharge. The procedures of Example 3 were repeated, except that the base and the vibrating plate were exposed to a corona discharge having an intensity of 20 W.min/m² in the air. Polar groups were formed on the surfaces activated by the corona discharge, and greatly improved their wetting property.

EXAMPLE 6

In this example the surfaces defining the ink passageways of a recording head were treated by corona discharge. The procedures of Example 3 were repeated, except that the base and the vibrating plate were exposed to a corona discharge having an intensity of 20 W.min./m² in air. Polar groups were formed on the surfaces activated by the corona discharge, and greatly improved their wetting property.

Similar results were obtained on recording heads wherein the vibrating plates and the bases were formed from the other resins of the type listed above.

EXAMPLE 7

In this example an electron beam was used for the surface treatment. The procedures of Example 3 were repeated, except that 2 Mrads of 100 KeV electron beam was radiated on the base and the vibrating plate in air. Polar groups were formed on the sufaces activated by the radiation, and greatly improved their wetting property.

Similar results were obtained on recording heads wherein the vibrating plates and the bases were formed from other resins of the type listed above.

EXAMPLE 8

In this example a flame was used for the surface treatment. The procedures of Example 3 were repeated, except that the resin surfaces were exposed to an oxidizing flame produced by propane gas in air. Polar groups were formed on the surfaces by the flame treatment, and greatly improved their wetting property.

Similar results obtained on the recording heads wherein the vibrating plates and the bases were formed from the other resins of the type listed above.

EXAMPLE 9

In this example oleum was used for the surface treatment. A base and a vibrating plate, which had both been formed from a polysulfone resin were washed and dried and dipped in a solution (oleum) containing 80% by weight of $H_2SO_4$ and 20% by weight of $SO_3$ for a period of 30 seconds to 10 minutes at room temperature. After the base and vibrating plate had been washed with water and dried, they were joined together and cut as in Example 3 to provide a recording head. The head was comparable or even superior to the product of Example 3 in stability and reliability of the wetting property of the surfaces defining the ink passageways, resistance to washing, high temperatures and long periods of immersion in ink. Sulfonic groups were, among others, formed on the surfaces activated by oleum, and greatly improved their wetting property.

The base end and the vibrating plate showed a particularly high adhesive strength therebetween and improved moisture resistance. This demonstrates that oleum is particularly suitable for the surface treatment of a head which will be filled with ink.

Similar results were obtained on the recording heads wherein the vibrating plates and the bases were formed from the other resins of the type listed above.

Oleum which may be used for the treatment of the surfaces defining the ink passageways contains between about 40 to 99.9% by weight of $H_2SO_4$ and 0.1 to 60% by weight of $SO_3$.

EXAMPLE 10

In this example $SO_3$ gas was used for the surface treatment. A base and a vibrating plate, which had both been formed from a polysulfone resin were washed and dried. They were then joined together and cut as in Example 1 to provide a recording head. A gaseous mixture containing 10% by volume of sulfur trioxide ($SO_3$) and 90% by volume of air was introduced by a pump into the head, and the head was left as it was for five hours. The head was washed and dried and showed results similar to those obtained after dipping in oleum as described in Example 8.

The use of gas for the treatment has the advantage of providing uniform activating treatment of the smallest portions of a recording head which is particularly easy to remove any bubbles.

Similar results were obtained on the recording heads the vibrating plates and the bases were formed from the other resins of the type listed above.

The gaseous mixture suitable for the treatment contains between about 0.1 to 100% by volume of $SO_3$.

It will thus be seen that the objects set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ngredients or compounds recited in the singular are intended to include compatible mixtures of such ingredients wherever the sense permits.

What is claimed is:

1. An ink-jet recording head, comprising a base and a vibrating plate attached to said base, said base and said plate having surfaces for defining therebetween a plurality of ink passageways terminating in a nozzle at one end of said head, said base and said plate being both formed from a single synthetic thermoplastic resin wherein said ink contacting surfaces have been treated with a uniform surface treatment to form polar goups for increasing the wetting properties of the surfaces.

2. The ink-jet head of claim 1, wherein the wetting properties are increased by treating the surfaces with an activating treatment selected from the group of treatments including a $K_2Cr_2O_7$—$H_2SO_4$ solution, a $H_2SO_4$—$SO_3$ solution, $SO_3$ gas, ultraviolet rays, plasma, corona discharge, electron beam and a flame.

3. The ink-jet recording head of claim 1, wherein the resin is selected from the group consisting of polysulfone, polyether sulfone, AS, ABS, polybutylene terephthalate, polyarylate, polyether ether ketone, polymethyl methacrylate, polycarbonate, polyester, polyamide, polyimide, polyphenylene oxide, polyphenyl ether and polyphenylene sulfide resins.

4. The ink-jet recording head of claim 1, wherein the synthetic resin is polysulfone.

5. The ink-jet recording head of claim 2, wherein the synthetic resin is polysulfone.

6. A process for forming an ink-jet recording head having a base and a vibrating plate attached to said base, said base and said plate having surfaces for defining therebetween a plurality of ink passageways terminating in a nozzle at one end of said head, said base and said plate being both formed from a single synthetic thermoplastic resin, comprising, joining the base and plate to form the passageways of the head, treating the surfaces of the passageway by exposing the surface to a $K_2Cr_2O_7$—$H_2SO_4$ solution containing between about 35 to 65% by weight $H_2SO_4$, 5 to 35% by weight $K_2Cr_2O_7$ and 0 to 65% by weight $H_2O$ or by exposing the surface to an $H_2SO_4$—$SO_3$ solution containing between about 40 to 99.9% by weight $H_2SO_4$ and 0.1 to 60% by weight $SO_3$ to increase the wetting properties thereof by forming polar groups uniformly on the surfaces and cutting said one end of the passageway to form the nozzles.

7. The process of claim 6, wherein the surface treating is achieved by exposing the surfaces to one of a $K_2Cr_2O_7$—$H_2SO_4$ solution, a $H_2SO_4$—$SO_3$ solution, $SO_3$ gas, ultraviolet rays, plasma, corona discharge, electron beam and flame.

8. The process of claim 6, wherein said surface treatment is carried out before said plate is attached to said base.

9. The process of claim 6, wherein said treatment is carried out after said plate has been attached to said base.

10. The process of claim 6, wherein the synthetic resin is selected from the group consisting of polysulfone, polyether sulfone, AS, ABS, polybutylene terephthalate, polyarylate, polyether ether ketone, polymethyl methacrylate, polycarbonate, polyester, polyamide, polyimide, polyphenylene oxide, polyphenyl ether and polyphenylene sulfide resins.

11. An ink-jet recording head, comprising a nozzle at one end of the head, at least one passageway in fluid communication with the nozzle, and wherein the nozzle has an inner surface and an outer end portion, said nozzle being formed from a synthetic resin, wherein the wetting property of the inner surface of the nozzle is different than the wetting property of the outer end portion of the nozzle from which the ink ejects and wherein the wetting property of the inner surface of the nozzle is substantially the same as the wetting property of glass.

12. The ink-jet recording head of claim 11, further comprising a base and a vibrating plate, and wherein the base and the vibrating plate have surfaces for defining therebetween the at least one passageway terminating in the nozzle.

13. The ink-jet recording head of claim 11, wherein the wetting property of the outer end portion of the nozzle is lower than the wetting property of the inner surface of the nozzle.

14. The ink-jet recording head of claim 11, wherein the wetting property of the inner synthetic resin surface of the nozzle is obtained by treatment thereof.

15. The ink-jet recording head of claim 11, wherein the transparency of the treated surfaces is different from the transparency of untreated portions.

16. The ink-jet recording head of claim 11, wherein the surface of the passageway is treated to increase the wetting property by forming polar groups prior to cutting one end of the passageway to form the nozzle.

17. The ink-jet recording head of claim 16, wherein the inner surface of the nozzle is treated by drawing a solvent into the nozzle so as to provide a wetting property different than the wetting property of the cut end of the passageway.

18. The ink-jet recording head of claim 11, wherein the wetting property of the inner surface of the nozzle is improved by forming polar groups on the inner surface.

* * * * *